United States Patent [19]

Beisch

[11] 4,447,092

[45] May 8, 1984

[54] WHEEL TRIM RETENTION

[75] Inventor: Hans R. Beisch, Amherstburg, Canada

[73] Assignee: NI Industries, Inc., Novi, Mich.

[21] Appl. No.: 342,781

[22] Filed: Jan. 26, 1982

Related U.S. Application Data

[63] Continuation of Ser. No. 114,285, Jan. 22, 1980, abandoned.

[51] Int. Cl.³ .............................................. B60B 7/00
[52] U.S. Cl. .............................. 301/37 P; 301/108 A
[58] Field of Search .............. 301/37 R, 37 P, 37 ST, 301/37 T, 37 TP, 108 R, 108 A; 29/159 A

[56] References Cited

U.S. PATENT DOCUMENTS

| | | |
|---|---|---|
| 1,954,140 | 4/1934 | Lyon . |
| 1,985,378 | 12/1934 | Lyon .................................. 301/37 T |
| 2,736,610 | 2/1956 | Waite . |
| 2,842,405 | 7/1958 | Lyon . |
| 2,937,902 | 5/1960 | Barnes . |
| 2,963,324 | 12/1960 | Wood . |
| 3,252,738 | 5/1966 | Huntley . |
| 3,252,739 | 5/1966 | Huntley . |
| 3,333,900 | 8/1967 | Aske, Jr. . |
| 3,367,720 | 2/1968 | Aske, Jr. . |
| 3,397,918 | 8/1968 | Aske, Jr. et al. . |
| 3,397,921 | 8/1968 | Aske, Jr. . |
| 3,416,840 | 12/1968 | Gibbings . |
| 3,512,840 | 5/1970 | Foster et al. ...................... 301/37 R |
| 3,532,386 | 10/1970 | Marshall . |
| 3,594,046 | 7/1971 | Marshall . |
| 3,601,449 | 8/1971 | Buerger . |
| 3,663,064 | 5/1972 | McCarroll ......................... 301/37 P |
| 3,876,257 | 4/1975 | Buerger . |
| 4,007,967 | 2/1977 | Buerger . |
| 4,027,919 | 6/1977 | Foster et al. . |
| 4,131,322 | 12/1978 | Beisch et al. ...................... 301/37 R |
| 4,220,373 | 9/1980 | Spisak ............................... 301/37 P |

FOREIGN PATENT DOCUMENTS 469632   7/1937   United Kingdom ........... 301/108 A Primary Examiner—H. Grant Skaggs
Attorney, Agent, or Firm—Harness, Dickey & Pierce

[57] ABSTRACT

A wheel trim retention system is disclosed which comprises an ornamental trim member fabricated from a polymeric composition and a retention band mechanically interlocked thereto in such a manner as to substantially reduce the residual stresses on the trim member heretofore encountered in attachment of retention bands to polymeric composition wheel trim. In one embodiment, a plurality of retaining flanges are integrally molded on the trim member to further assist in maintaining the mechanically interlocked connection between the trim member and the retention band. In another embodiment, deformable tab portions are provided to assist the mechanical interlock connection. The retention band also includes suitable wheel engaging retention members and may also be provided with integrally formed remotely actuated secondary retention portions. A method of assembly is also disclosed.

26 Claims, 13 Drawing Figures

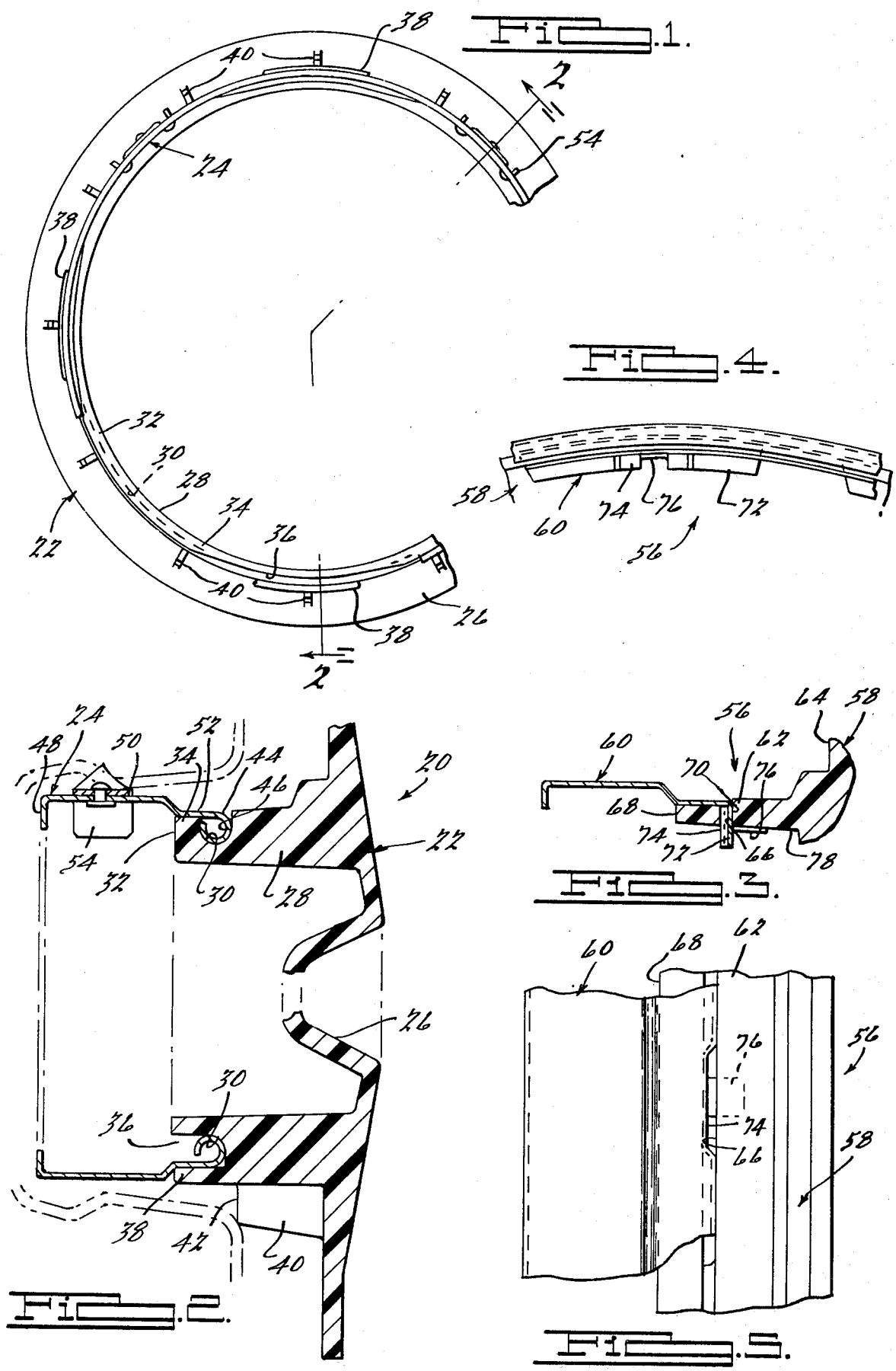

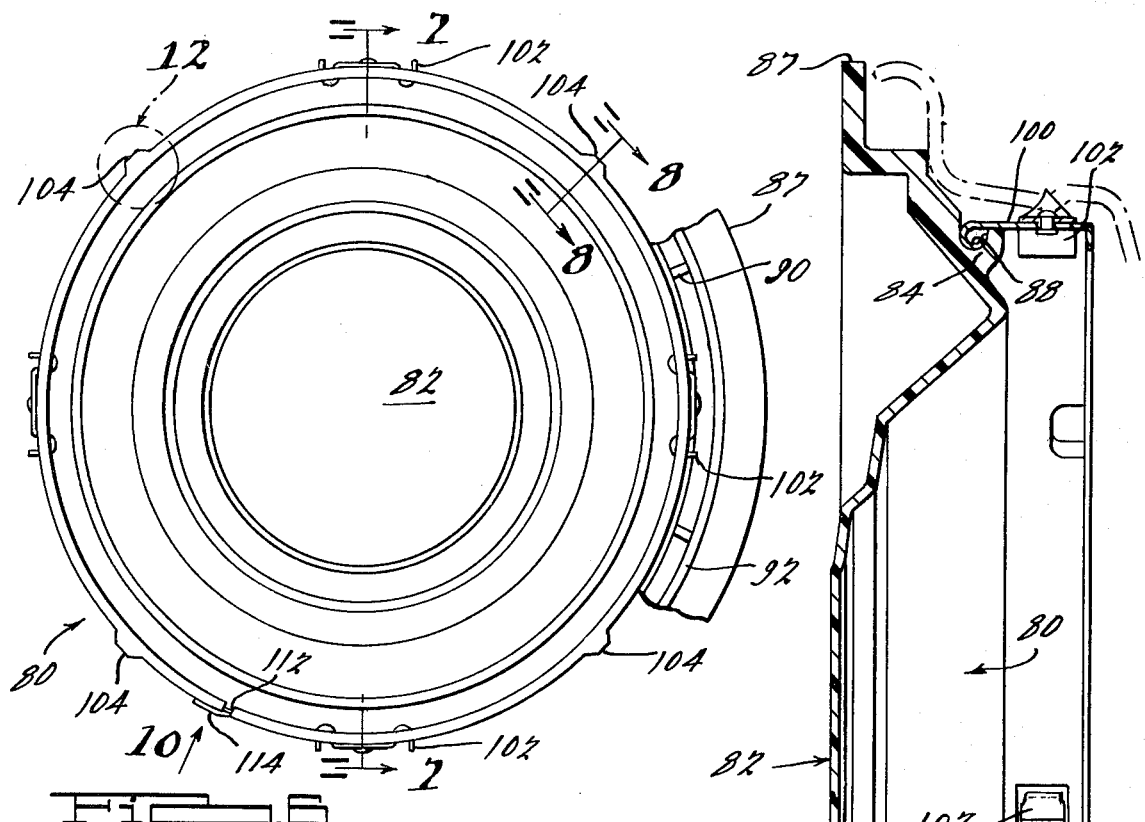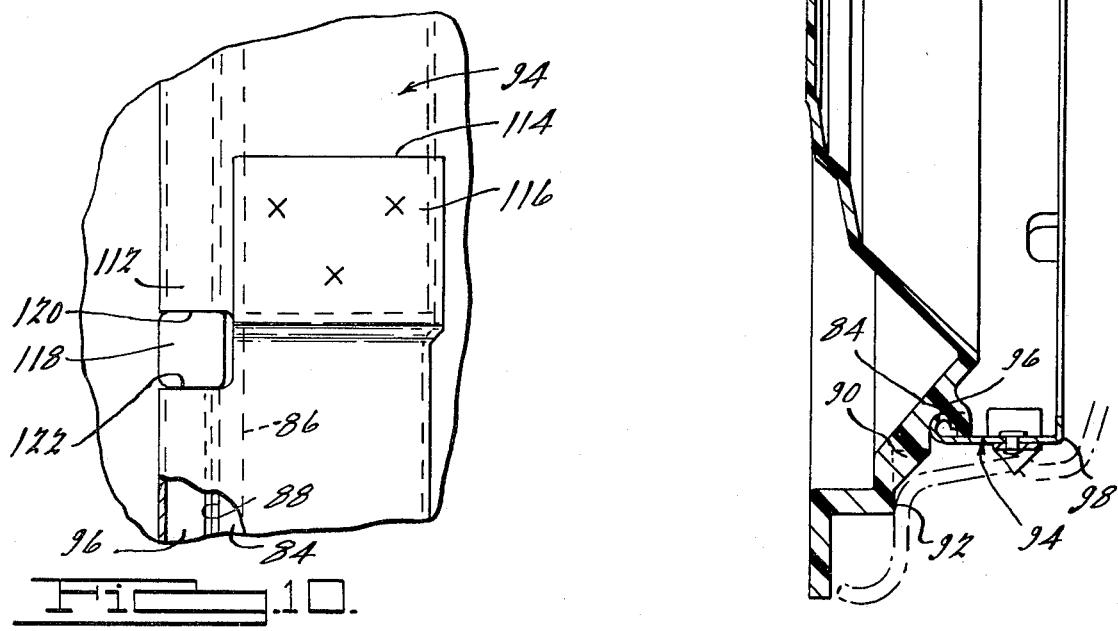

WHEEL TRIM RETENTION

This is a continuation of application Ser. No. 114,285, filed Jan. 22, 1980, now abandoned.

BACKGROUND AND SUMMARY OF THE INVENTION

The present invention relates generally to wheel trim retention systems (including assembly methods) and more particularly to retention systems particularly designed for use with polymeric composition trim members.

Polymeric compositions are particularly desirable for use in fabricating wheel trim because of their ability to be easily and quickly molded into almost any shape or design, they allow fabrication of relatively lightweight wheel trim and they are not subject to corrosion. However, because such materials may not perform well when subjected to continuous stress such as may be exerted thereon by many types of conventional retention systems, use of these materials has not been as widely accepted as might be expected given the various advantages of such materials for this application.

A number of retention systems have been designed for use with polymeric composition wheel trim which utilize either a retention band or separate retention clips having a number of projections thereon which bitingly engage a portion of the trim member such as the inner or outer surfaces of a flange portion. However, the use of a biting engagement results in a localized stress being exerted on the trim member. This stress may result in cracking or otherwise damaging the wheel trim over a period of time or when the wheel trim is subjected to low temperature extremes.

While numerous attempts have been made to design a retention system particularly suited for use with polymeric composition wheel trim providing retention means in the form of an annular band or separate clips which do not subject the trim material to high localized stresses, most of these systems require either assembly of a number of separate components or performing additional assembly operations thereon to secure the retention means to the trim member. For example, in one form the retention means is secured to the wheel trim by rolling or otherwise forming a metal strip, which may be either a separate piece or an integral part of a retention band, over the outer peripheral edge of the trim ring. In another form, a number of pins are provided on the trim member which are received within openings in the retention band and then heat staked or otherwise deformed so as to provide an enlarged head thereon. While some of these systems may offer satisfactory performance, the need to fabricate and assemble numerous parts or perform additional operations on the wheel trim results in increased manufacturing costs.

The present invention provides a wheel trim having a retention system which overcomes these disadvantages by eliminating the need to perform additional assembly or manufacturing operations in connection with the attachment of the retention system to the wheel trim and yet also provides a retention system which substantially reduces the stresses to which the wheel trim may be subjected to. Additionally, the retention system of the present invention is designed to be assembled and secured to the trim ring as a single unit thereby assisting in reducing manufacturing costs associated therewith.

The retention system of the present invention includes a wheel trim which may be fabricated from a polymeric composition and which includes means defining a generally axially inwardly extending radially outwardly facing flange portion. An annular retention band is also provided which is designed so as to enable it to be easily and economically manufactured in strip form and which is designed to cooperate and form a mechanical interlock with the flange portion of the trim member so as to retain the retention band and trim member in assembled relationship. Because of the nature of the mechanical interlock, the retention band does not need to tightly engage the flange portion and thus the problems associated with subjecting polymeric materials to continuous stress are substantially eliminated. Additionally, because the retention band is of a design which enables it to be easily and conveniently manufactured in strip form such as by rolling or the like and because it may be directly attached to the trim member without the need to manufacture and separately attach additional screws or other means to secure the retention band to the trim member, the present retention system is very economical in terms of both labor and time to manufacture. Thus, the present invention provides a secure reliable retention system which allows the advantages offered through use of polymeric composition trim members to be obtained both economically and efficiently.

Additional advantages and features of the present invention will become apparent from the subsequent description and the appended claims taken in conjunction with the accompanying drawings.

BRIEF DESCRIPTION OF THE DRAWINGS

FIG. 1 is a view in elevation of a wheel trim in accordance with the present invention as seen when looking at the axially inwardly facing surface thereof;

FIG. 2 is an enlarged section view of the wheel trim the section being taken along line 2—2 thereof;

FIG. 3 is a fragmentary section view of a wheel trim showing another embodiment of the present invention, the section being taken along an axially extending radial plane;

FIG. 4 is a fragmentary view of the embodiment of FIG. 3 as seen when looking axially outwardly;

FIG. 5 is also a fragmentary view of the embodiment of FIG. 3 as seen when looking radially inwardly;

FIG. 6 is a view similar to that of FIG. 1 but showing another embodiment of the present invention;

FIG. 7 is a sectioned view of the embodiment of FIG. 6, the section being taken along line 7—7 thereof;

FIG. 10 is an enlarged fragmentary view of a wheel trim in accordance with the present invention as seen looking radially inwardly and showing an arrangement for joining opposite ends of the retention band;

DESCRIPTION OF THE PREFERRED EMBODIMENTS

Figure 11:
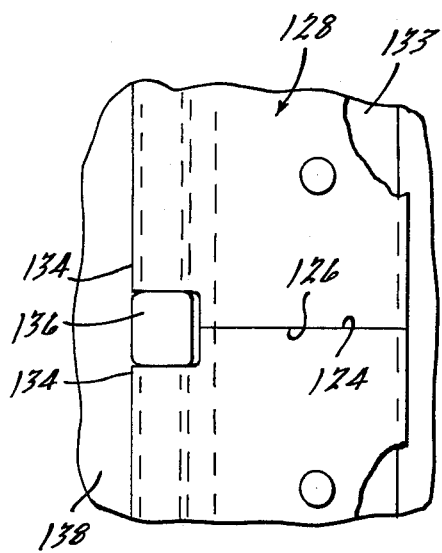
FIG. 11 is a view similar to that of FIG. 10 but showing another arrangement for joining the ends of the retention band all in accordance with the present invention.

Referring now to the drawings and in particular to FIGS. 1 and 2, there is shown a wheel trim indicated generally at 20 having a retention system for securing the wheel trim in overlying relationship to the axially outwardly facing surface of a vehicle wheel and which includes a trim member 22 and a retention band 24 secured thereto.

As shown, trim member 22 is fabricated from a suitable polymeric composition material and includes a generally circular shaped outer portion 26, the outer surface of which may be contoured and finished so as to provide an aesthetically pleasing appearance complementing the vehicle to which it is applied. The axially inwardly facing surface has a generally axially inwardly extending annular flange portion 28 which includes a radially outwardly opening groove 30 adjacent the axially inner edge 32 thereof. As best seen with reference to FIG. 1, the axially inner wall portion 34 of the flange portion 28 overlying groove 30 is omitted at several discrete circumferentially elongated locations 36 around the periphery of the flange portion 28 so as to afford access to groove 30 in an axial direction at these locations. An additional generally axially inwardly extending retaining flange member 38 is integrally formed with trim member 22 at each of these locations being positioned radially outwardly of and immediately adjacent flange portion 28 so as to overlie the radially outwardly facing opening of groove 30. Retaining flange 38 extends circumferentially a relatively short distance and is positioned generally centrally with respect to circumferentially elongated locations 36 where inner wall portion 34 has been omitted. Preferably four such locations 36 are provided equally spaced around trim 22 and each having a discrete retaining flange 38 associated therewith.

A plurality of integrally formed flanges 40 are also provided on the trim member 22 being integrally formed therewith and extending generally radially outwardly from the axial outer surface of the flange portion 28. Radially extending flanges 40 are each substantially shorter in an axial direction than flange 28 and define an axially inwardly facing locating shoulder 42 adapted to axially position wheel trim 20 relative to a vehicle wheel. Preferably, one of these plurality of shoulders will be positioned approximately midway between the circumferentially opposite ends of each of retaining flanges 38 and will operate to stiffen and resist radially outward deformation thereof.

Retention band 24 comprises an elongated member of a length sufficient to enable it to extend completely around the axially outer periphery of flange portion 28 of trim member 22. Retention band 24 has an irregular shape in transverse cross-section generally as shown including an axially outer edge portion 44 which is rolled or otherwise folded radially inwardly so as to form a substantially continuous generally circularly shaped annular bead 46. The axially inner edge 48 of retention band 24 is also folded radially inwardly as well. A pair of generally radially extending substantially planar surface portions 50 and 52 are provided between the edge portions 44 and 48, the axially inner surface portion 50 being slightly radially offset from axially outer surface portion 52. As best seen with reference to FIG. 2, this radial offset is selected so as to accommodate retaining flange 38 and to thereby place the radially outer surfaces of the retaining flange 38 and the axially inner planar surface 50 in substantially coplanar relationship. A plurality of retention clips 54 are secured to the axially inner surface portion 50 of the retention band, being positioned in circumferentially spaced relationship to each other. Retention clips 54 are adapted to engage a generally radially inwardly facing surface portion of a flanged vehicle wheel so as to retain the wheel trim in position thereon. While any suitable retention clips may be utilized, retention clips 54 as illustrated are substantially identical to those disclosed in U.S. Pat. No. 4,131,322 entitled "Wheel Trim Retention" which is assigned to the same assignee as the present application the disclosure of which is hereby incorporated by reference.

In order to assemble retention band 24 to the trim member 22, the bead portion 46 of a suitable length of retention band stock with retention clips 54 secured thereto is fitted into groove 30 provided on the axially inwardly extending flange portion. As is apparent, the axially inner wall portion 34 of the flange portion 28 is omitted adjacent each of the retaining flanges 38 so as to enable the bead portion 46 to be axially fitted into groove 30 in these areas. Once bead 46 has been fully inserted into groove 30, the opposite ends of the retention band 24 may then be secured in a manner as set forth below. Once the ends of retention band 24 have been secured together, the engagement between the bead 46 and groove 30 will cooperate to provide a mechanical interference therebetween which will sufficiently restrict relative movement so as to retain the retention band 24 and trim member 22 in assembled relationship. The retaining flanges 38 also assist in retaining bead 46 in engagement with groove 30 particularly during temperature extremes which may cause substantial dimensional changes in either retention band 24, trim member 22 or both.

This arrangement for securing a retention band is particularly well suited for use with polymeric composition trim members as bead 46 formed in the retention band 24 does not need to tightly engage groove 30 but rather can be somewhat loosely fitted therein so as to avoid stressing the polymeric material. Thus, the dimensional and structural relationship between the bead provided on the retention band and the groove formed in the trim member cooperate to provide a strong positive mechanical interlock therebetween thereby retaining the trim member and retention band in assembled relationship.

Referring now to FIGS. 3 through 6, another embodiment of the present invention is shown being indicated generally at 56 and comprising a trim member 58 having a retention band 60 secured thereto.

In this embodiment, trim member 58 is also preferably fabricated from a polymeric composition and has a generally axially inwardly extending annular flange portion 62 integrally formed therewith being spaced radially inwardly slightly from the peripheral edge 64 thereof. A plurality of circumferentially extending slots 66 are provided along flange portion 62 adjacent the axially inner edge 68 thereof which extend radially therethrough. Suitable radially outwardly extending axially inwardly facing locating shoulders may also be provided on the trim member similar to those illustrated in connection with the embodiment of FIGS. 1 and 2.

Retention band 60 is similar to the retention band of FIGS. 1 and 2, however, in this embodiment the axially outer edge 70 is provided with a plurality of discrete spaced circumferentially and generally radially inwardly extending tab portions 72. Tab portions 72 are suitably positioned and dimensioned so as to be received with each of the plurality of slots 66 provided on flange portion 62.

As best seen with reference to FIGS. 3 and 5, a number of tab portions 72 have an embossed portion 74 centrally disposed therealong. Embossed portion 74 projects through slot 66 and operates to insure a relatively snug fit therein thereby preventing relative axial play or movement between the retention band 60 and trim member 58 which could result in annoying noise when wheel trim 56 is installed on a vehicle. Additionally, a deformable tab 76 is also provided which may be bent axially outwardly so as to engage the radially inner surface 78 of flange portion 62 and thereby assist in retaining retention band 60 in assembled relationship with trim member 58.

Retention band 60 will preferably be fabricated in elongated strips of suitable length which may then be wrapped around flange portion 62 of the trim member 58 and thereafter the opposite ends secured together. The provision of a plurality of discontinuous mating slots 66 and tab portions 72 around the periphery of trim member 58 and retention band 60 will also operate to prevent relative rotation therebetween.

Another embodiment of the present invention is illustrated and will be described with reference to FIGS. 6 and 7 being indicated generally at 80. In this embodiment, a trim member 82 is provided which is generally similar to that of trim member 22 of FIGS. 1 and 2 and includes a generally axially inwardly extending flange portion 84 which is integrally formed with trim member 82 and positioned radially inwardly from the peripheral edge 87 thereof. Flange portion 84 is also provided with a substantially continuous radially outwardly opening annular groove 88 of a generally "U" shape in cross-section. An axial locating shoulder 92 is also incorporated in the design of trim 82 extending radially outwardly from flange portion 84 and is engageable with a portion of the vehicle wheel so as to axially position the trim member with respect thereto. A plurality of reinforcing ribs 90 extend between shoulder 92 and flange portion 84 and operate to reinforce and stiffen both flange portion 84 and shoulder 92.

A retention band 94 is also provided which is similar to that illustrated in and described with reference to FIGS. 1 and 2 including a beaded axially outer edge 96 and a radially inwardly folded inner edge 98. However, in this embodiment the retention band has a single axially extending generally planar surface 100 extending between the axially inner and outer edges 98 and 96 respectively. A plurality of retention clips 102 substantially identical to retention clips 54 secured to retention band 24 are also secured to retention band 94 in substantially equally circumferentially spaced relationship.

Figure 8:
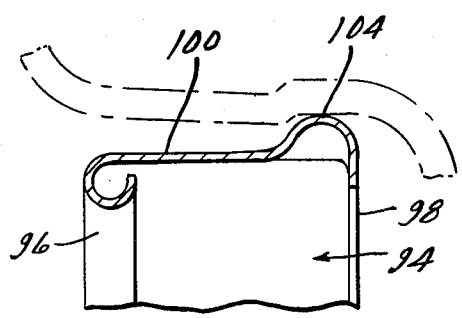
FIG. 8 is an enlarged fragmentary sectioned view of a portion of the retention band of FIG. 6 and showing the mechanically actuated secondary retention means provided thereon, the section being taken along line 8—8 of FIG. 6.
Figure 9:
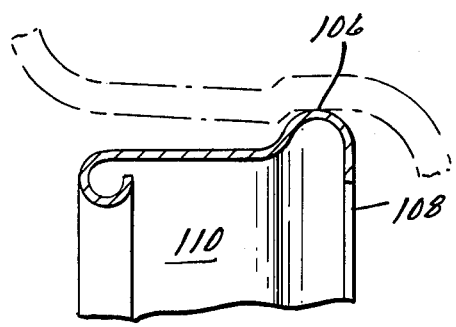
FIG. 9 is a view similar to that of FIG. 8 but illustrating another embodiment of a mechanically actuated secondary retention means.

As best seen with reference to FIG. 8, retention band 100 also has a plurality of radially outwardly extending protrusions 104 integrally formed thereon adjacent the axially inner edge 98 and positioned approximately midway between each of the retention clips 102. As retention clips 102 are moved into engagement with the vehicle wheel, the retention forces transmitted to retention band 94 cause it to distort from a true circular shape thereby moving portions of the retention band 94 located between the retention clips 102 radially outwardly. This distortion causes protrusions 104 to move into engagement with a portion of the vehicle wheel so as to provide a secondary frictional retention force as well as limiting further distortion of retention band 94 and thereby increasing the force of engagement of the retention clips 102 with the vehicle wheel. Alternatively, rather than discrete protrusions 104 the secondary retention means may be in the form of a continuous annular bead 106 along the axially inner edge 108 such as is formed on the retention 110 illustrated in FIG. 9. This primary-secondary retention arrangement is disclosed more fully in U.S. Pat. No. 4,131,322 entitled "Wheel Trim Retention" and assigned to the same assignee as the present invention.

It should be noted that while only the embodiment of FIGS. 6 and 7 has been illustrated as including this secondary retention system, either embodiment thereof may easily be provided on any of the other retention bands shown herein. Likewise, if desired, this secondary retention system may be omitted from the embodiment of FIGS. 6 and 7.

Retention band 94 may either be assembled to trim member in the same manner as described above by first wrapping the retention band 94 around flange portion 84 with bead 96 being positioned in groove 88 and then securing the opposite ends 112 and 114 together or alternatively, ends 112 and 114 may first be secured together and thereafter bead 96 snapped over the axially inner edge 86 of the flange portion and into groove 88.

Referring now to FIGS. 10 and 11, there are shown two methods by which the opposite ends of any of the retention bands disclosed herein may be easily and suitably secured together. In the embodiment of FIG. 10, end portion 114 of retention band 94 is provided with a reduced width tab portion 116 which is positioned in overlapping relationship with the opposite end portion 112 and secured thereto in any suitable manner such as by spot welding. In order to prevent relative rotation between trim member 82 and retention band 94, annular groove 88 is interrupted by a protrusion 118 formed on the axially inwardly extending flange portion 84 which projects radially outwardly into an opening defined by opposed spaced edges 120 and 122 of bead 96. As the opposite ends 120 and 122 of bead 96 engage the protrusion or lug on either side, relative rotation between the trim member and retention band is effectively prevented.

Alternatively, as seen in FIG. 11, the opposite ends 124 and 126 of a retention band 128 may be positioned in abutting relationship and secured together by means of a tying member 133 fastened therebetween such as by suitable rivets 132 or the like. In this arrangement however, the axially outer edge 138 of one or both ends of the retention band will preferably be notched so as to accommodate a protrusion 136 or lug formed on the trim member 138.

Figure 12:
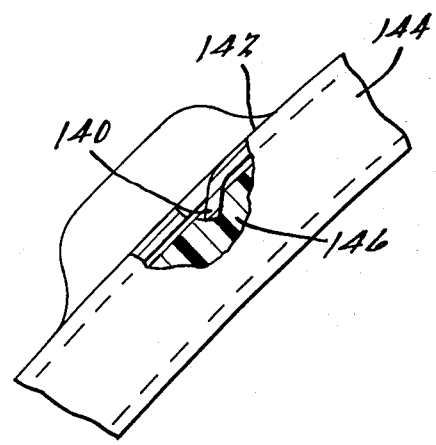
FIG. 12 is an enlarged fragmentary view of the portion of the wheel trim shown in FIG. 6 enclosed within circle 12 with portions thereof broken away and showing an arrangement for preventing relative rotation between the retention band and the wheel trim.

An alternative arrangement for preventing relative rotation between the trim member and retention band is illustrated in FIG. 12. In this arrangement, a tab portion 140 is provided along the generally axially extending planar portion 142 of the retention band 144 which is deformed radially inwardly so as to engage the axially extending flange portion 146 of the trim member so as to prevent relative rotation therebetween. It should be noted that in some applications it may be desirable to utilize both the lug arrangements of FIGS. 10 and 11 in conjunction with one or more deformed tabs such as that illustrated in FIG. 12 so as to provide greater assurance than no relative rotation will occur.

Figure 13:
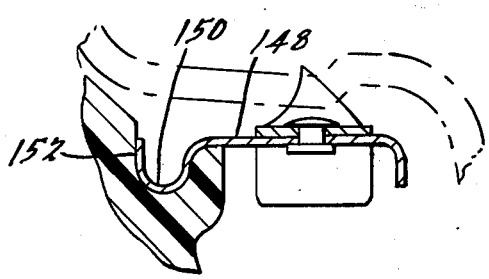
FIG. 13 is a view similar to that of FIG. 3 but showing another embodiment of a retention band in accordance with the present invention.

Referring now to FIG. 13 another embodiment of the present invention is illustrated in which a retention band 148 is shown which is substantially identical to the retention band of FIGS. 6 and 7 with the exception that the bead 150 formed on the axially outer edge 152 thereof. In this embodiment, bead 150 is formed with a generally radially outwardly opening U-shape in transverse cross-section rather than the generally circular shape radially inwardly rolled bead previously disclosed. The assembly and operation of this embodiment is substantially identical to that previously disclosed.

While it will be apparent that the preferred embodiments of the invention disclosed are well calculated to provide the advantages and features above stated, it will be appreciated that the invention is susceptibel to modification, variation and change without departing from the proper scope of fair meaning of the subjoined claims.

I claim:

1. A wheel trim for a vehicle wheel comprising:
   a trim member having means defining a generally axially extending annular flange portion having a generally radially outwardly facing surface positionable in generally radially opposed relationship to the axially extending flange portion of a standard vehicle wheel when said trim member is assembled thereto and a radially outwardly extending portion;
   locking means including a generally radially outwardly opening recess formed on said radially outwardly facing surface of said trim member and extending circumferentially thereof, portions of said recess opening axially inwardly at a plurality of circumferentially spaced locations;
   a continuous metallic retention band;
   means provided on said retention band for cooperating with said locking means to attach said retention band to said trim member in a non-biting assembled relationship;
   a plurality of circumferentially extending retaining flanges positioned radially outwardly from said retention band, said retaining flanges being operative to maintain said cooperating means in engagement with said recess;
   said retention band including an annular flange portion extending axially inwardly from said cooperating means; and
   retention means on said flange portion of said retention band, said retention means being engageable with said vehicle wheel and operative to retain said wheel trim when said wheel trim is installed thereon, said radially outwardly extending portion of said trim member overlying and substantially concealing said retention band.

2. A wheel trim as set forth in claim 1 wherein said recess comprises a plurality of circumferentially elongated spaced slots extending generally radially through said flange portion.

3. A wheel trim as set forth in claim 1 wherein said retaining flanges overlie a portion of said radially outwardly opening recess.

4. A wheel trim as set forth in claim 3 wherein said retaining flanges are positioned to overlie said recess at said spaced locations.

5. A wheel trim as set forth in claim 4 wherein said trim member further includes a plurality of spaced axial locating shoulders, one of said locating shoulders extending radially outwardly from each of said retaining flanges and being operative to assist in resisting radially outward deflection of said retaining flanges.

6. A wheel trim as set forth in claim 1 wherein said trim member is fabricated from a polymeric composition and said flange portion, means defining said recess and said retaining flanges are all integrally formed therewith.

7. A wheel trim as set forth in claim 1 wherein said cooperating means comprises a portion of said retention band received within said locking means, said portion providing a mechanical interlock between said retention band and said trim member operative to resist separation of said retention band from said trim member.

8. A wheel trim as set forth in claim 1 wherein said cooperating means comprises a radially inwardly extending portion formed on said retention band, said radially inwardly extending portion being fitted within said recess.

9. A wheel trim as set forth in claim 8 wherein said radially inwardly extending portion comprises a bead formed on said retention band.

10. A wheel trim as set forth in claim 9 wherein said bead is positioned on said retention band adjacent the axially outer edge thereof.

11. A wheel trim as set forth in claim 9 wherein said recess is a groove.

12. A wheel trim as set forth in claim 8 wherein said radially inwardly extending portion comprises a plurality of circumferentially elongated spaced tab portions, and said trim member includes a plurality of said recesses positioned in circumferentially spaced relationship respective of said tab portions being received within respective of said recesses.

13. A wheel trim as set forth in claim 12 wherein selected ones of said tab portions include an embossed portion, said embossed portion being operative to prevent relative axial movement of said selected ones of said tab portion within said recesses.

14. A wheel trim as set forth in claim 1 wherein said trim member includes integrally formed means cooperating with said retention band to prevent relative rotation therebetween.

15. A wheel trim as set forth in claim 14 wherein said relative rotation preventing means include a radially outwardly projecting lug formed on said trim member and a cutout portion provided on said retention band, said lug being received within said cutout portion.

16. A wheel trim as set forth in claim 15 wherein said retention band is formed from an elongated strip and includes a pair of opposite end portions which are secured in overlapping relationship, said cutout portion being formed between said opposite ends.

17. A wheel trim as set forth in claim 15 wherein said retention band is formed from an elongated strip and includes a pair of opposite end portions which are secured together in abutting relationship, said cutout portion being formed between said opposite ends.

18. A wheel trim as set forth in claim 1 wherein said portion of said retention band received within said locking means is loosely received therein.

19. A wheel trim for a vehicle wheel comprising:

a trim member having means defining a generally axially extending flange portion having a generally radially outwardly facing surface positionable in generally radially opposed relationship to the axially extending flange portion of a standard vehicle wheel when said trim member is assembled thereto and a radially outwardly extending portion;

locking means including a circumferentially extending generally radially outwardly opening groove formed on said radially outwardly facing surface of said trim member, said groove including circumferentially elongated portions opening axially inwardly at a plurality of circumferentially spaced locations;

a continuous metallic retention band having a radially inwardly extending bead provided thereon for cooperating with said locking means to attach said retention band to said trim member in a non-biting assembled relationship;

means engageable with a radially outer surface portion of said retention band to assist in retaining said bead within said groove; and retention means on said retention band, said retention means being engageable with said vehicle wheel and operative to retain said wheel trim in position thereon when said wheel trim is installed thereon.

20. A wheel trim as set forth in claim 19 wherein said means engaging said radially outwardly facing surface portion of said retention band comprises a plurality of circumferentially extending retaining flanges positioned radially outwardly adjacent said flange portion, said retaining flanges being operative to maintain said bead in engagement with said groove.

21. A wheel trim as set forth in claim 20 wherein said retaining flanges are positioned to overlie the radial outward opening of said groove at said spaced locations.

22. A wheel trim as set forth in claim 11 wherein said trim member further includes a plurality of spaced axial locating shoulders, one of said locating shoulders extending radially outwardly from each of said retaining flanges and being operative to assist in resisting radially outward deflection of said retaining flanges.

23. A wheel trim for a vehicle wheel comprising:
a trim member having means defining a generally axially extending annular flange portion having a generally radially outwardly facing surface positionable in generally radially opposed relationship to the axially extending flange portion of a standard vehicle wheel when said trim member is assembled thereto and a radially outwardly extending portion;

locking means including a plurality of circumferentially spaced generally radially outwardly opening recesses formed on said radially outwardly facing surface of said trim member and extending circumferentially around a portion of said surface;

a continuous metallic retention band;

a plurality of circumferentially elongated spaced tab portions formed on said retention band and extending generally radially inwardly, respective of said tab portions being received within respective of said recesses to provide a non-biting mechanical interlock between said retention band and said trim member operative to resist separation of said retention band from said trim member, selected ones of said tab portions including an embossed portion, said embossed portion being operative to prevent relative axial movement of said selected ones of said tab portion within said recesses, said selected ones of said tab portions also including a deformable member, said recesses on said trim member extending generally radially through said flange portion, and said deformable member engages a radially inwardly facing surface of said flange portion, said retention band including an annular flange portion extending axially inwardly from said cooperating means; and retention means on said flange portion of said retention band, said retention means being engageable with said vehicle wheel and operative to retain said wheel trim when said wheel trim is installed thereon, said radially outwardly extending portion of said trim member overlying and substantially concealing said retention band.

24. A wheel trim for a vehicle wheel comprising:
a trim member fabricated from a polymeric composition and having means defining a generally axially extending flange portion including a generally radially outwardly facing surface positionable in generally radially opposed relationship to the axially extending flange portion of a standard vehicle wheel and a decorative generally axially outwardly facing surface overlying said radially outwardly facing surface;

an annular retention band having a retention flange portion extending axially inwardly beyond said means defining said flange portion;

a retaining bead formed on said retention band, said retaining bead being relatively loosely fitted within a radially outwardly opening groove provided on said flange portion and cooperating therewith in a non-biting relationship to provide a mechanical interlock therebetween operative to resist separation of said retention band from said trim member; said groove opening axially inwardly at a plurality of spaced circumferentially extending locations;

a plurality of circumferentially extending spaced retaining flanges integrally formed on said trim member positioned so as to overlie the radially outwardly opening portions of said groove for a portion of said circumferentially extending locations, said retaining flange being operative to assist in retaining said bead within said groove and said axially inwardly opening portions of said groove being operative to enable said bead to be fitted to said grooves; and retention means provided on said retention flange portion, said retention means being engageable with said vehicle wheel to retain said wheel trim in position thereon when said wheel trim is assembled thereto with said decorative surface being operative to conceal said retention band.

25. A wheel trim as set forth in claim 24 wherein said wheel trim includes a radially outwardly projecting lug formed thereon and said retention band has a cutout portion, said lug being received within said cutout portion and cooperating therewith to prevent relative rotation therebetween.

26. A wheel trim for a vehicle wheel comprising:
a trim member fabricated from a polymeric composition and having means defining a generally axially extending flange portion including a generally radially outwardly facing surface positionable in generally radially opposed relationship to the axially extending flange portion of a standard vehicle wheel and a decorative generally axially outwardly facing surface overlying said radially outwardly facing surface;

a radially outwardly opening groove provided on said flange portion, said groove also opening axially inwardly at a plurality of spaced circumferentially extending locations;

a retention band;

retaining means including a bead provided on said retention band, said bead being fitted within said groove and cooperating therewith in a non-biting relationship to provide a mechanical interlock therebetween operative to resist separation of said retention band from said trim member;

said trim member further including a plurality of circumferentially extending spaced retaining flanges integrally formed thereon and positioned so as to overlie the radially outwardly opening portions of said groove for a portion of said circumferentially extending locations, said retaining flange being operative to assist in retaining said bead within said groove and said axially inwardly opening portions of said groove being operative to enable said bead to be fitted into groove;

retention means provided on said retention band, said retention means including a plurality of retention clips secured to the periphery of said retention band adapted to bitingly engage said vehicle wheel when said wheel trim is installed thereon and secondary retention means integrally formed on said retention band, said secondary retention means being moved into engagement with a circumferentially spaced portion of said vehicle in response to distortion of said retention band resulting from engagement of said retention clips with said vehicle wheel.

* * * * *